April 7, 1959  G. STAVIS  2,881,436
MICROWAVE DUAL BEAM LINEAR ARRAY
Filed April 8, 1955  2 Sheets-Sheet 1

INVENTOR.
GUS STAVIS
BY
ATTORNEY

April 7, 1959

G. STAVIS 2,881,436

MICROWAVE DUAL BEAM LINEAR ARRAY

Filed April 8, 1955

INVENTOR.
GUS STAVIS

BY

ATTORNEY

United States Patent Office 2,881,436
Patented Apr. 7, 1959

2,881,436

MICROWAVE DUAL BEAM LINEAR ARRAY

Gus Stavis, Ossining, N.Y., assignor to General Precision Laboratory Incorporated, a corporation of New York Application April 8, 1955, Serial No. 500,249

3 Claims. (Cl. 343—844)

This invention relates to radio antenna assemblies for microwave frequencies and particularly to such assemblies in linear form which simultaneously radiate two beams.

In the measurement of aircraft speed and drift, employing Doppler radar, it is sometimes useful to employ the so-called Janus method of operation in which two beams are emitted simultaneously, these two beams being directed toward the earth at equal and opposite angles to the vertical. Such a pair of beams may be radiated by one dual beam linear array, by a pair of single beam linear arrays, one for each beam, or by a planar combination of either of these types of linear arrays. To simplify the phasing problem and to secure economy of weight and space the dual-beam array is preferred to the two single-beam arrays. However, dual-beam antennas using slot or other types of radiators coupled into waveguide have heretofore had the disadvantage of very high frequency sensitivity, therefore requiring high dimensional accuracy and being narrow band in operation.

The antenna array of the present invention possesses impedance and radiation characteristics which are relatively insensitive to changes in the microwave transmitting frequency, which is to say that it is wide band and does not demand unreasonably high manufacturing accuracy. In addition the array emits two beams at equal and opposite angles to the normal to the array axis at the design frequency. When these beams are used in the Janus method of Doppler measurement the received Doppler difference frequency is completely independent of the microwave transmitting frequency.

The array which is provided by this invention comprises a single line of microwave radiators. Each radiator is polarized in a plane parallel to the array axis and perpendicular to the average direction of the two emitted beams at the design frequency. The directions of polarization of the radiators in this plane vary from each radiator to the next by 90°, alternately plus and minus, and the radiators have a uniform spacing of $\lambda_g/4$ (where $\lambda_g$ is the guide wavelength).

The radiators may be of any desired kind such as, for example, dipoles, slots, or a combination of slots and probes. The radiators may be excited from a waveguide or transmission line of any type.

One purpose of this invention is to provide a single linear microwave radiator array having uniform radiator spacing of one-quarter wavelength in guide and emitting two principal beams of radiation.

Another purpose of this invention is to provide a single linear microwave radiator array emitting two principal beams of radiation in a plane at equal positive and negative angles to the normal to the array.

Another purpose of this invention is to provide a single linear microwave antenna array which is non-resonant, and which emits two beams suitable for use in Janus Doppler radar operation, the Doppler difference frequency being independent of the transmitting frequency.

Further understanding of this invention may be secured from the detailed description and the associated drawings, in which.

Figure 4:
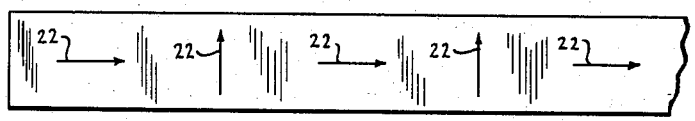
Figure 5:
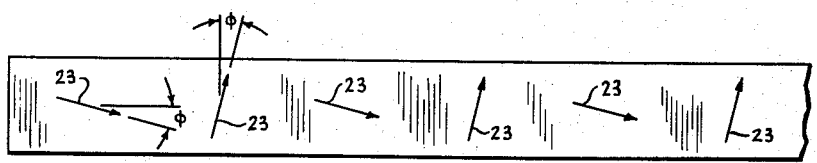

Figures 4 and 5 schematically depict other arrangements of antennas to form arrays in accordance with the requirements of the invention.

Figure 6:
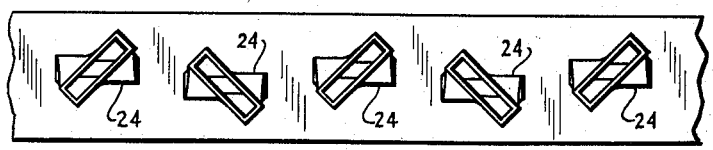

Figure 6 is a view of the broad face of a rectangular guide provided with slot antennas forming an array in accordance with the invention.

Figure 7:
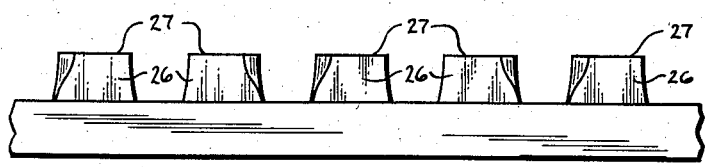

Figure 7 is a side view of the array of Fig. 6.

Figure 1:
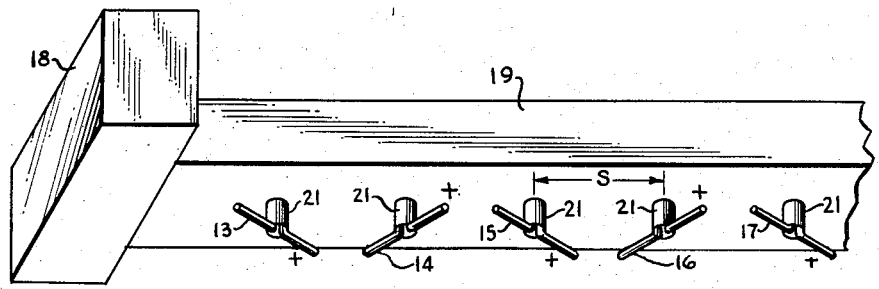
Figure 1 depicts a linear array of antennas oriented and poled in accordance with the requirements of the invention.

Referring now to Figure 1 depicting one form of array configuration in accordance with this invention, an analysis of the principle of operation may be made by considering this array as comprising two arrays which have been superimposed. This may be understood by reference to Figure 2 wherein the currents flowing along the dipoles are represented by vectors 13, 14, 15, 16 and 17, of proper amplitude and orientation corresponding to the excitation and positioning of the dipoles. These vectors may be separated into equal orthogonal components, designated by the prime numbers of Figure 2. Each component vector of any dipole has a parallel counterpart in the components of all other dipoles. Thus, all components parallel to the array axis may be considered as one linear array and the radiation pattern associated with it may be readily computed. Similarly, all components normal to the array axis may be considered to constitute a second linear array and the radiation pattern for these may be readily computed. These two radiation patterns may be summed to obtain the total radiation pattern for the physical dipoles. The details of this analysis are described below.

The vectors 13', 14', 15', 16', 17', etc. represent a linear array, with polarization transverse to the array axis and with elements of alternating polarity (a so-called "anti-phased" array). The vectors 13", 14", 15", 16", 17", etc. represent a linear array, with polarization parallel to the array axis, and with elements of like polarity (a so-called "in-phase" array). The direction of the main beam of radiation will be derived for both cases beginning with the "in-phase" array.

Figure 3:
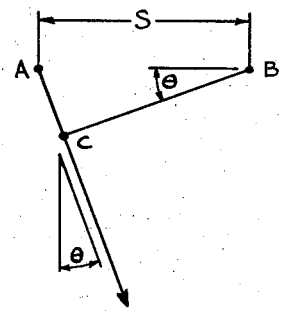
Figure 3 is a diagram illustrating the production of a microwave beam.

In Figure 3 the points A and B represent positions of two adjacent electromagnetic radiators located in the face of a waveguide. When these radiators are excited by energy such as microwave energy applied from the left, the condition under which a beam of radiation is formed in the direction AC is that the phase is the same at all points along the wave front CB. The phase delay at C in space relative to that at A is $2\pi AC/\lambda$, in which $\lambda$ is wavelength in space, and the phase delay at B in the line of the radiators relative to that at A is $2\pi s/\lambda_g$, in which $\lambda_g$ is wavelength in the conductor or guide feeding the radiators and $s$ in the distance AB. Since these phases are equal along CB, $$2\pi\frac{AC}{\lambda} - 2\pi\frac{s}{\lambda_g} = 0 \qquad (1)$$

A multiplicity of beams of radiation may exist for values of spacing, $s$, which are large. In such cases additional equiphase fronts exist corresponding to directions where the delay AC is greater than one wavelength, thus:

$$2\pi\frac{AC}{\lambda} - 2\pi\frac{s}{\lambda_g} + 2\pi M = 0 \qquad (2)$$

where M is any positive or negative integer or zero and may be considered to correspond to the order of the principal lobe in question. Also it is evident that $AC/s = \sin \theta$ in which $\theta$ is the angle between the direction $AC$ and the normal to the line of radiators. Therefore $$\sin \theta = \frac{\lambda}{\lambda_g} - \frac{\lambda M}{s} \qquad (3)$$

The foregoing has assumed that the radiators are similarly oriented and coupled to the transmission line or waveguide with like polarity of coupling (the case of the "in-phase" array).

If an arrangement is used wherein alternate radiators in the array couple to the transmission line or waveguide with opposite polarity of coupling (the case of the "anti-phase" array) then by a similar analysis the direction of maximum radiation may be found. In this case a delay of $\pi$ is introduced in Equation 1 to account for the alternation in coupling polarity, thus:

$$\frac{2\pi AC}{\lambda} - \frac{2\pi s}{\lambda_g} + \pi + 2\pi M = 0 \qquad (4)$$

whence:

$$\sin \theta' = \frac{\lambda}{\lambda_g} - \frac{\lambda}{2s} - \frac{M\lambda}{s} \qquad (5)$$

In Equations 3 and 5 the values of $\theta$ and $\theta'$ corresponding to allotted values of M represent principal beam direction angles. When more than one value of M satisfies the equation, that is, results in a value of the sine less than unity, the physical interpretation is that more than one principal beam is emitted, one for each such value of M, selected values being assigned to $\lambda$, $\lambda_g$, and $s$. For example, if the dimensions of the array and the assigned value of $\lambda$ permit zero and $+1$ to be inserted as values for M, then two beams are simultaneously emitted in different directions. In the usual case it is desirable in employing Equations 3 and 5 to confine their operation to the single-beam condition, which is to say that the antenna parameters must be chosen so that $M=0$ is the only value assignable to both equations. These equations then simplify respectively to $$\sin \theta = \frac{\lambda}{\lambda_g} \qquad (6)$$

and $$\sin \theta' = \frac{\lambda}{\lambda_g} - \frac{\lambda}{2s} \qquad (7)$$

Since the total radiation is equal to the sum of the radiation from the component parts of the array it may be seen that the linear antenna array of this invention is composed of a single line or array of antennas so arranged that it radiates in a dual manner, radiating one beam in accordance with Equation 6 and radiating a second beam in accordance with Equation 7. In both cases the constructional dimensions are usually so chosen that when $M=0$ the sines of the beam angles are less than unity, but when M has any other value the sines are greater than unity so that the corresponding beams do not exist.

In order that the two beams emitted by the array of the invention be useful in the Janus type of radar operation, it is desirable that they make equal angles to the normal at the center frequency of operation, that is $$\theta = -\theta' \qquad (8)$$

and $$\sin \theta = -\sin \theta' \qquad (9)$$

In order to find what value of $s$ produces this result Equations 3, 5, and 9 are solved simultaneously, thus:

$$\frac{\lambda}{\lambda_g} = \frac{\lambda}{\lambda_g} - \frac{\lambda}{2s} \qquad (10)$$

resulting in $$s = \frac{\lambda_g}{4} \qquad (11)$$

Then, from 6 and 7, $$\sin \theta = \frac{\lambda}{4s} \qquad (12)$$

and $$\sin \theta' = -\frac{\lambda}{4s} \qquad (13)$$

In Fig. 1, representing an array in accordance with the invention as before stated, a microwave generator 18 applies microwave energy to one end of a rectangular hollow microwave guide 19, the other end being non-reflectively terminated. The single line of equally spaced radiators composed of bar dipoles 13, 14, 15, 16, 17, etc. is fed with microwave energy through short coaxial lines 21 from the interior field space of the hollow guide 19. These dipoles have equal lengths such as to radiate efficiently at the microwave frequency employed. They are equally spaced by a distance $s$ which is made to satisfy Equation 11 and which therefore is one-quarter of the wave-length in guide. All dipoles are oriented at 45° to the center line of the guide, alternately $+45°$ and $-45°$, so that adjacent dipoles are perpendicular to each other. The alternate dipoles are coupled to the guide with like polarity in this case.

Figure 2:
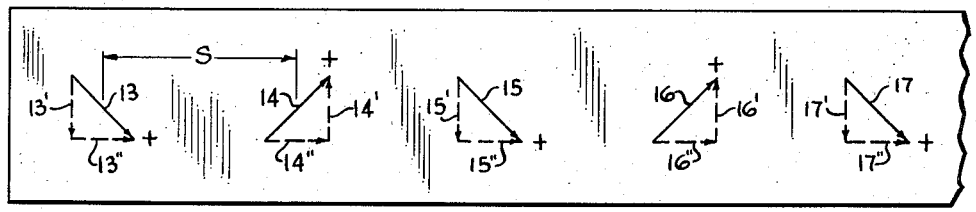
Figure 2 illustrates a linear array in accordance with the invention depicted as a series of voltage vectors with orthogonal components representing two virtual arrays.

In the vector representation of Fig. 2, the in-phase virtual array 13″, 14″, 15″, 16″, 17″ radiates in accordance with Equation 3 and the anti-phased array 13′, 14′, 15′, 16′, 17′ radiates in accordance with Equation 5. Operation of the device in practice shows that when the dipoles shown in Fig. 1 and represented in Fig. 2 by vectors 13, etc., are energized, their radiation is as if it came from the two sets of virtual components.

The array thus emits two beams at equal and opposite angles to the normal, these beams behaving as if generated by like-poled and oppositely-poled radiators. These beams are therefore suitable for Janus Doppler radar operation, and the Doppler difference frequency derived from the echo signal is completely insensitive to variations in the microwave frequency. In addition, as the antenna element spacing is quarter-wavelength, the array is non-resonant and therefore does not require sharp tuning for proper impedance matching and design dimensions are not critical.

It is obvious that the same operation will be secured if in Figs. 1 and 2 the orientations of alternate radiators be changed by 180°.

It is not a necessary condition that the radiators be oriented at plus and minus 45° to the guide axis so that their vector components are longitudinally and transversely oriented relative to the guide, but only that the orientation of adjacent radiators be at right angles to each other. Figure 4 illustrates one example of an array in which vector arrows 22 representing radiators are positioned alternately longitudinally and transversely to the guide axis, and Fig. 5 illustrates vectors 23 representing radiators positioned at a small angle $\phi$ to the axis and to the normal thereto.

It will be noted that the progressions of the orientations of the radiators in the arrays of Figs. 1, 2, 4, and 5 are all the same, namely, with successive orientation changes of $+90°$, $-90°$, $+90°$, etc. This progression is essential to the proper operation of the array in accordance with the invention.

The foregoing description has been concerned with the dipole as a radiator for use in the scheme. The same principles may be applied to slots cut in the feed waveguide. For example, Figs. 6 and 7 illustrate a kind of slot which provides the right orientations and polarities of the space fields while at the same time having couplings to the waveguide which can be varied from slot to slot to secure any desired illumination. This is accomplished by displacing the longitudinal slots 24 by greater or less distances from the guide longitudinal center line, the slots either being all on the same side of the center line or alternately on one side and the other. Each guide slot is coupled to space through a twisted guide 26, so that the mouth 27 is at an angle of 45° relative to its guide slot, adjacent mouths having an angular difference of 90°.

What is claimed is:

1. A microwave linear two-beam array comprising, a hollow rectangular waveguide adapted to be energized by microwave energy at one end, and a linear array of radiators positioned in a plane and connected to said guide for energization therefrom, said radiators being regularly spaced apart by one-quarter guide wavelength of said microwave energy, alternate radiators being oriented and poled in one selected direction in said plane and the remaining radiators being oriented and poled alike in said plane in another selected direction at 90° to said first mentioned selected direction.

2. A microwave linear two-beam array comprising, a hollow rectangular waveguide adapted to be energized by microwave energy at one end and a linear array of radiators positioned in a plane and connected for center-feed energization from said guide, said radiators being regularly spaced apart by one-quarter guide wavelength of said microwave energy, alternate radiators being oriented and poled in said plane in one selected direction and the remaining radiators being oriented and poled alike in said plane in another selected direction at 90° to said first-mentioned selected direction, said radiators forming two arrays of virtual radiators, one virtual array being like-poled and the other virtual array being reverse-poled, whereby two principal beams are formed at equal angles to said plane, said two beams being in a plane perpendicular to said first named plane.

3. A microwave linear two-beam array comprising, a hollow rectangular waveguide adapted to be energized by microwave energy at one end, a linear array of radiators positioned in a plane along said waveguide and coupled thereto for energy transfer between said radiators and said waveguide, said radiators being regularly spaced at intervals of substantially one-quarter of the wavelength of the energy in said waveguide, alternate radiators being oriented and poled in one selected direction in said plane, and the remaining radiators being oriented and poled in said plane in another selected direction at substantially 90° to said first mentioned direction.

References Cited in the file of this patent
UNITED STATES PATENTS

| | | |
|---|---|---|
| 2,573,746 | Watson | Nov. 6, 1951 |
| 2,681,990 | Purcell | June 22, 1954 |
| 2,755,467 | Eyges | July 17, 1956 |
| 2,756,421 | Harvey et al. | July 24, 1956 |
| 2,834,014 | Thorne | May 6, 1958 |